(12) United States Patent
Miyazaki (10) Patent No.: US 9,802,410 B2
(45) Date of Patent: Oct. 31, 2017

(54) INK JET PRINT HEAD

(75) Inventor: Hirotaka Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 792 days.

(21) Appl. No.: 13/556,389

(22) Filed: Jul. 24, 2012

(65) Prior Publication Data
US 2012/0287205 A1    Nov. 15, 2012

Related U.S. Application Data

(62) Division of application No. 12/472,889, filed on May 27, 2009, now Pat. No. 8,272,130.

(30) Foreign Application Priority Data

Jun. 6, 2008  (JP) ................................ 2008-149376
May 8, 2009  (JP) ................................ 2009-113565

(51) Int. Cl.
*B41J 2/165*    (2006.01)
*B41J 2/16*    (2006.01)
(Continued)

(52) U.S. Cl.
CPC ......... *B41J 2/1623* (2013.01); *B29C 65/1406* (2013.01); *B29C 65/1412* (2013.01); *B29C 65/4835* (2013.01); *B29C 65/5057* (2013.01); *B29C 66/53461* (2013.01); *B29C 66/9672* (2013.01); *B29C 2035/0827* (2013.01); *B29K 2083/00* (2013.01); *B29L 2031/767* (2013.01); *B41J 2002/14362* (2013.01); *B41J 2202/22* (2013.01); *Y10T 29/49083* (2015.01); *Y10T 29/49133* (2015.01); *Y10T 29/49401* (2015.01); *Y10T 156/10* (2015.01)

(58) Field of Classification Search
None
See application file for complete search history.

(56) References Cited

U.S. PATENT DOCUMENTS 5,852,460 A * 12/1998 Schaeffer ............. B41J 2/14024
                                                          347/45
6,238,508 B1    5/2001 Hauer et al.
(Continued)

FOREIGN PATENT DOCUMENTS

JP    4-345858 A    12/1992
JP    11-147314 A    6/1999
(Continued)

OTHER PUBLICATIONS

Office Action dated Jul. 23, 2013, in Japanese Application No. 2009-113565.
(Continued)

*Primary Examiner* — Alejandro Valencia
(74) *Attorney, Agent, or Firm* — Fitzpatrick, Cella, Harper & Scinto (57) ABSTRACT

A method of manufacturing an ink jet print head capable of bonding the printing element substrate to the support surface with high precision in a reduced period of time is provided. For this purpose, raised flat portions are formed in the support surface of the supporting member to provide in an adhesive layer between the printing element substrate and the supporting member a portion of the thermosetting adhesive that is thinner than others. After the relative positions of the printing element substrate and the supporting member are adjusted, the thin portions of the adhesive layer are hardened. This enables the printing element substrate to be bonded to the supporting member in a relatively short period of time. As a result, if there are undulations on the support surface, the printing element substrate can be bonded to the supporting member with high precision, improving the mass productivity of the print head.

3 Claims, 9 Drawing Sheets (51) Int. Cl.
    *B29C 65/14*    (2006.01)
    *B29C 65/50*    (2006.01)
    *B29C 65/00*    (2006.01)
    *B29C 35/08*    (2006.01)
    *B29K 83/00*    (2006.01)
    *B29L 31/00*    (2006.01)
    *B41J 2/14*    (2006.01)
    *B29C 65/48*    (2006.01)

(56) References Cited

U.S. PATENT DOCUMENTS

| | | |
|---|---|---|
| 6,241,335 B1 | 6/2001 | Suzuki |
| 6,652,702 B2 * | 11/2003 | Miyazaki et al. ......... 156/272.2 |
| 7,309,120 B2 | 12/2007 | Hatsui et al. |
| 7,364,284 B2 | 4/2008 | Hatsui et al. |
| 2005/0285904 A1 | 12/2005 | Toge et al. |
| 2009/0237452 A1 | 9/2009 | Kurihara et al. |

FOREIGN PATENT DOCUMENTS

| | | |
|---|---|---|
| JP | 2002-154209 A | 5/2002 |
| JP | 2004-47573 A | 2/2004 |
| JP | 2005-138306 A | 6/2005 |
| JP | 2006-15733 A | 1/2006 |
| JP | 2007-290243 A | 11/2007 |

OTHER PUBLICATIONS

Office Action dated Apr. 16, 2013, in Japanese Application No. 2009-113565.

\* cited by examiner

INK JET PRINT HEAD

This application is a divisional of U.S. patent application Ser. No. 12/472,889, filed May 27, 2009.

BACKGROUND OF THE INVENTION

Field of the Invention

The present invention relates to a construction of an ink jet print head that can be installed in an ink jet printing apparatus and also to a method of manufacturing the same. More specifically, the invention relates to a method of bonding together with high precision in a short period of time a printing element substrate formed with ink ejecting print elements and a supporting member for supporting the printing element substrate and supplying it with ink.

Description of the Related Art

The ink jet printing apparatus uses a print head having a plurality of printing elements that eject ink according to print data to form dots and therefore an image on a print medium. In recent years, great efforts are being made to develop a print head capable of ejecting smaller ink droplets at high density to print highly defined images with enhanced precision.

Figure 9:
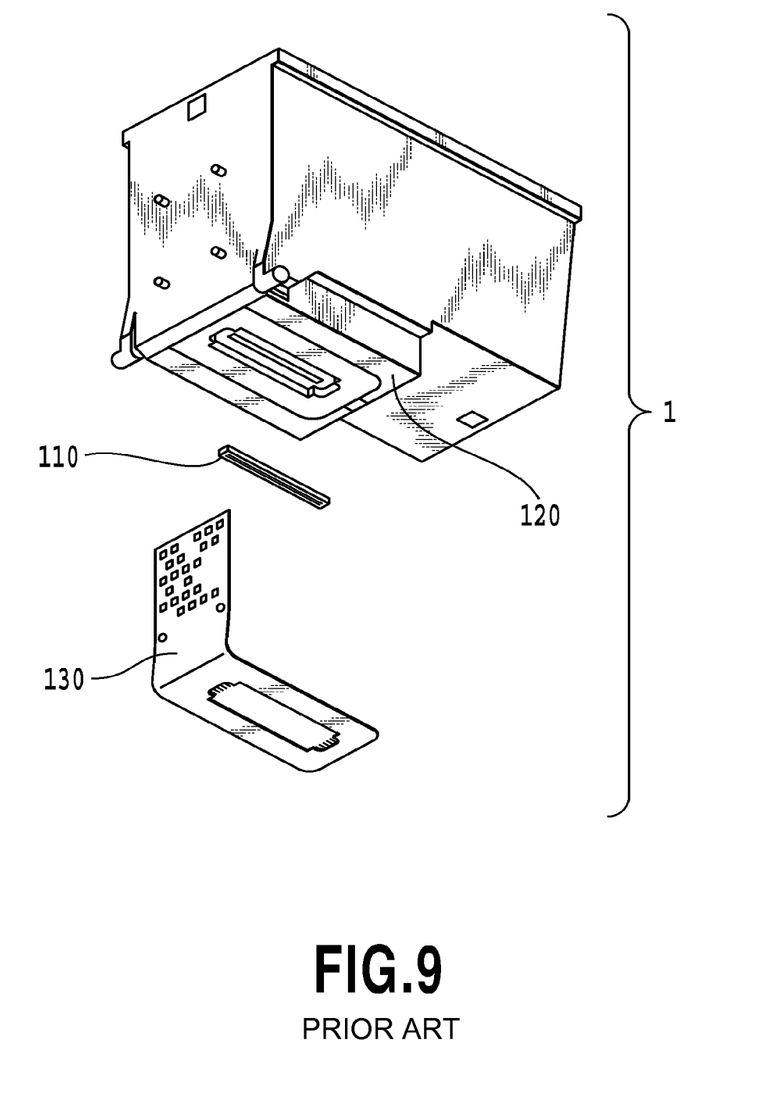
FIG. 9 is an exploded perspective view showing a construction of a side shooter type ink jet print head disclosed in Japanese Patent Laid-Open No. 2006-015733.

FIG. 9 is an exploded perspective view of a side shooter type ink jet print head disclosed in Japanese Patent Laid-Open No. 2006-015733. The ink jet print head 1 has a printing element substrate 110 with a plurality of printing elements, a supporting member 120 to supply ink to the printing element substrate 110 and an electric wiring board 130 to transmit a print signal to the printing element substrate 110.

Figure 10:
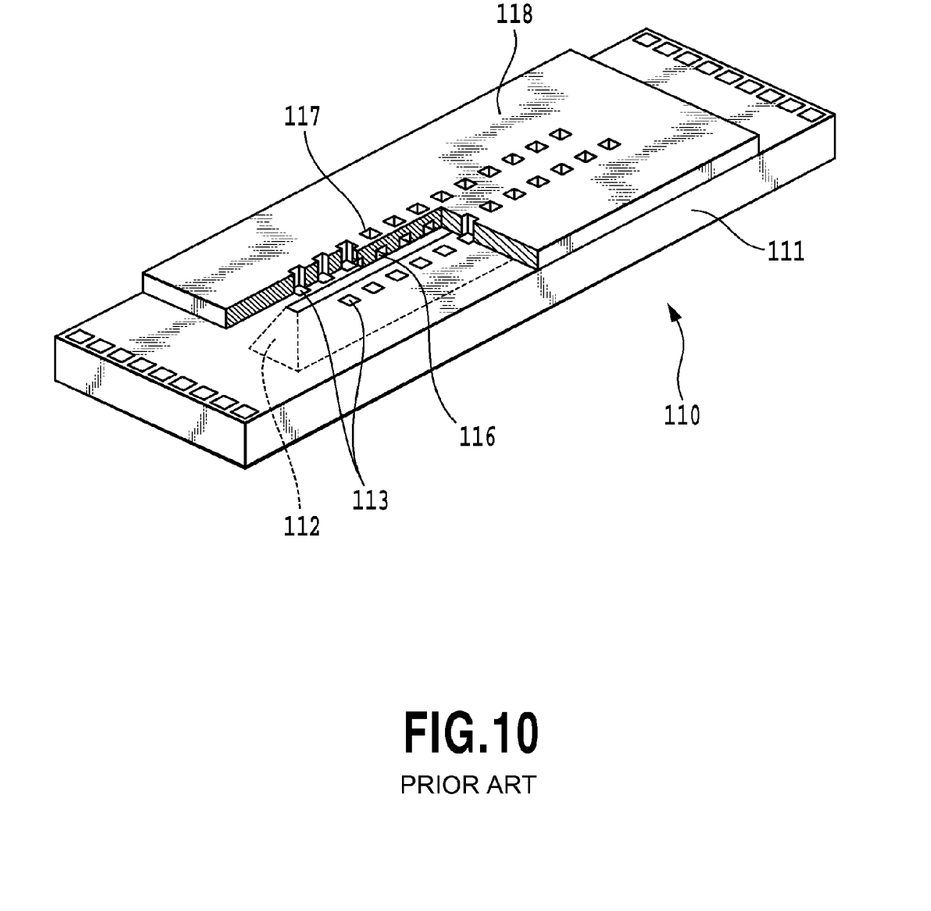
FIG. 10 shows a partly cut-away construction of the printing element substrate.

FIG. 10 is a perspective view showing the construction of the partly cut-away printing element substrate 110. The printing element substrate 110 has a silicon substrate 111, about 0.5-1 mm thick, formed with a groove-like ink supply port 112 by an anisotropic etching based on silicon crystal orientation or by sand blasting. On both sides of the ink supply port 112 on the silicon substrate 111 there are arranged electrothermal transducing elements 113 at a pitch corresponding to the print resolution. These elements 113, along with aluminum electric wiring for supplying electricity to the elements 113, are formed by photolithography. On the silicon substrate 111 an ink path-formed member 118 having ink paths 116 to introduce supplied ink to ejection openings 117 is arranged so that the ejection openings 117 face the electrothermal transducing elements 113. Each of the printing elements comprises the electrothermal transducing element 113, the ink path 116 and the ejection opening 117. The ink introduced from the ink supply port 112 to the ink paths 116 is ejected from the ejection openings 117 as ink droplets by a bubble expansion energy produced by individual electrothermal transducing elements 113. As the printing operation proceeds, ink is supplied stably from an ink tank on a supporting member 120 connected to the printing element substrate 110.

The supporting member 120 is designed not only to supply ink to the printing element substrate 110 as described above but also to support the printing element substrate 110 at a predetermined position. It is therefore desired that the supporting member 120 and the printing element substrate 110 be put at the predetermined relative positions in horizontal and vertical directions with high precision. More specifically, first, the ink supply port 112 of the printing element substrate 110 needs to be placed precisely at the position of an ink supply path formed in the supporting member 120. It is also desired that the direction in which the plurality of printing elements are arrayed in the printing element substrate 110 be set perpendicular to the main scan direction of the print head 1. Further, the ejection opening face of the printing element substrate 110 needs to be set parallel to a support surface 121 of the supporting member 120. Unless this third condition is met, the ejection opening face may be inclined with respect to a print medium, causing the ejected ink droplets to land on the print medium at an angle, degrading printed images.

The supporting member 120, however, is generally a molded product for reduced cost and improved processability, so that its support surface 121 may often result in a complex three-dimensional geometry, failing to have an ideal smooth surface. If the printing element substrate 110 is bonded to the unsmooth support surface 121 as is, the ejection opening face of the printing element substrate 110 can be directly affected by the three-dimensional slight undulations of the supporting member 120, being difficult for securing a plane parallel to the print medium.

For example, Japanese Patent Laid-Open No. 11-147314 (1999) discloses a construction in which a plurality of raised flat portions are provided on the support surface 121 and their flatness is kept in good condition to improve the parallelism of the ejection opening face. With this construction, if the support surface 121 other than the raised flat portions includes three-dimensional undulations, the horizontal plane of the ejection opening face can be secured.

Another technique has also been available in recent years in which the printing element substrate 110 is kept precisely at the predetermined position horizontally and vertically with respect to the support surface 121 by using CCD camera or the like and a bonding adhesive filled between the printing element substrate 110 and the support surface 121 is hardened by ultraviolet light.

Figure 11:
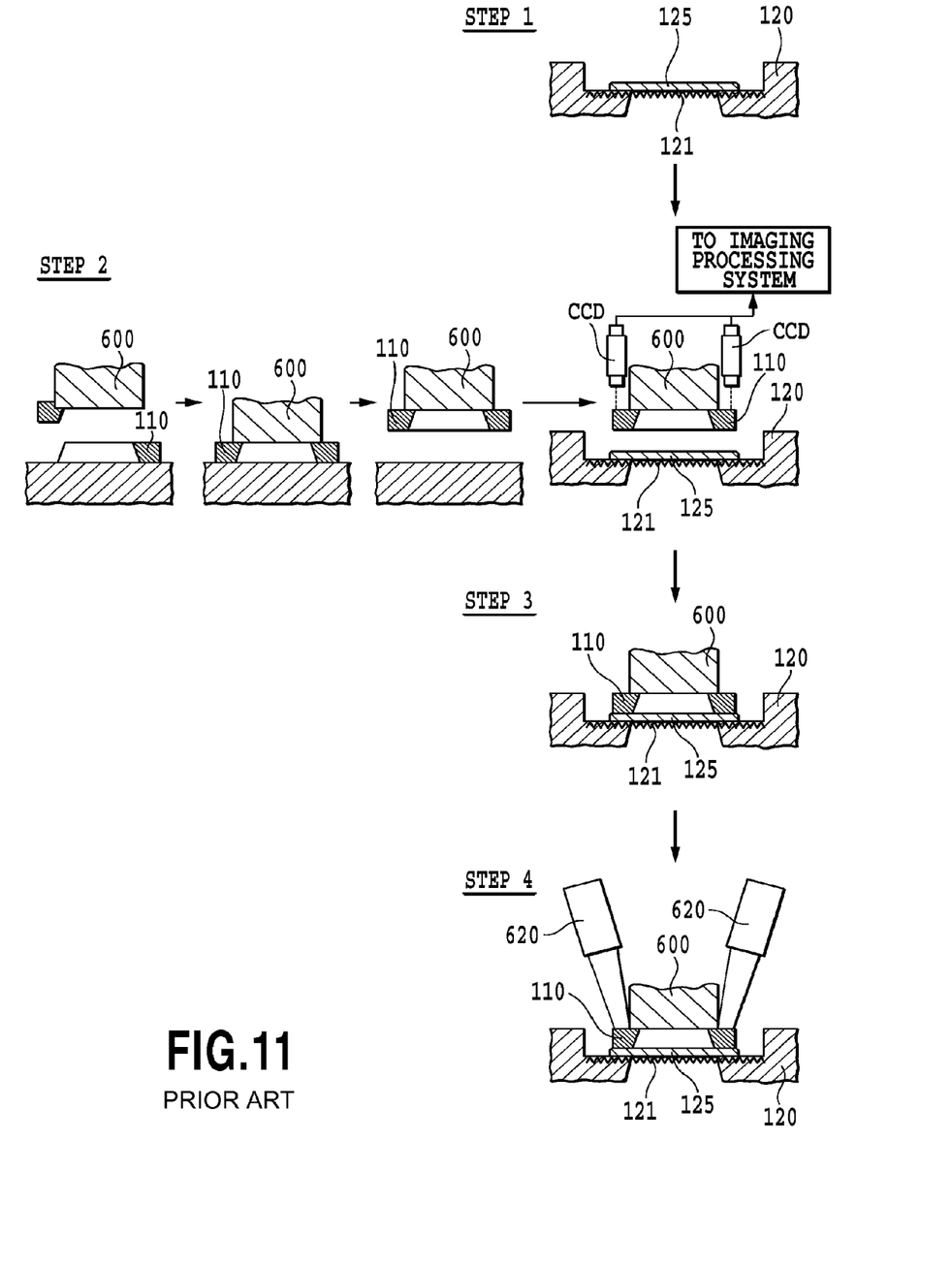
FIG. 11 shows a process of assembling a conventional print head.

FIG. 11 shows a process of assembling the print head that employs the above-described methods. First, in step 1, the support surface 121 of the supporting member 120 is applied with a thermosetting adhesive 125. Next, in step 2, the printing element substrate 110 electrically connected to the electric wiring board by a gang bonding method is sucked by a supply finger 600 and moved to over the supporting member 120. Further, in step 2, by using an image processing system with two CCD cameras, the printing element substrate 110 is located precisely at the predetermined position horizontally and vertically.

In step 3, the printing element substrate 110 is lowered to engage the thermosetting adhesive 125. At this time, the printing element substrate 110 is loosely placed in or floating on the thermosetting adhesive 125 without contacting the support member 120. Then, in step 4, with its attitude held as is, the printing element substrate 110 is heated by ultraviolet rays emitted from a light application device 620. This causes the thermosetting adhesive 125 in contact with the printing element substrate 110 to gradually harden, firmly bonding the printing element substrate 110 and the supporting member 120 together. Finally, circumferential portions of the printing element substrate 110 and its electric connections are sealed with a sealing material and heat-cured. Now, the print head is complete.

With this method, if there are slight undulations in the support surface 121, the adhesive layer with a uniform thickness greater than the height of the undulations enables the printing element substrate 110 to be bonded to the support surface 121 so that its ejection opening surface is horizontal. Such a method of bonding the printing element substrate using CCD and thermosetting adhesives is disclosed, for example, in Japanese Patent Laid-Open No. 2002-154209.

Even with the method of Japanese Patent Laid-Open No. 11-147314 (1999), however, there are some variations in height among a plurality of raised flat portions. The height variations make it difficult to achieve the degree of high levelness required in recent years. More specifically, although the height variations among the raised flat portions need to be kept within 10 μm from the standpoint of the print position accuracy, actual molding inevitably produces height variations of about 20 μm.

In the construction that uses an adhesive layer thicker than the height variations of undulations, the ejection opening surface of the printing element substrate 110 can be bonded parallelly to the support surface 121 without having to provide a plurality of raised flat portions. That is, although the support surface 121 of the molded part has undulations of about 50 μm, the use of the adhesive layer with a thickness of about 70 μm, greater than the undulations, enables the printing element substrate 110 to be fixed horizontally without being influenced by the undulations.

However, increasing the thickness of the adhesive layer naturally increases the amount of heat required to harden the thermosetting adhesive to a sufficient degree of hardness, i.e., the time it takes for the adhesive to harden. This in turn increases cost and time in the mass production of the ink jet print heads.

SUMMARY OF THE INVENTION

The present invention has been accomplished to solve the aforementioned problems. It is therefore an object of this invention to provide a method of manufacturing an ink jet print head that allows the printing element substrate to be bonded to a support surface accurately in a short time.

The first aspect of the present invention is an ink jet print head comprising: a printing element substrate having printing elements for ink ejection; a supporting member having at least one raised flat portion formed on a support surface thereof on which to support the printing element substrate; and a thermosetting adhesive to bond the printing element substrate and the supporting member; wherein, after the positions of the supporting member and the printing element substrate are adjusted, the thermosetting adhesive is hardened to bond the printing element substrate and the supporting member together.

The second aspect of the present invention is a method of manufacturing an ink jet print head, wherein the ink jet print head has a printing element substrate with printing elements for ink ejection and a supporting member having at least one raised flat portion formed on a support surface thereof on which to support the printing element substrate, the method comprising: applying a thermosetting adhesive to the support surface; adjusting a position of the printing element substrate relative to the support surface; maintaining an attitude of the printing element substrate while in contact with the thermosetting adhesive; and hardening the thermosetting adhesive by heating the printing element substrate.

The third aspect of the present invention is an ink jet print head comprising: a printing element substrate which has printing elements producing energy for ink ejection; a supporting member having a support surface thereof on which to support the printing element substrate; and an adhesive to bond the printing element substrate and the supporting member by being present between a bonding plane of the printing element substrate and the support surface; wherein, at least one raised flat portion which has an end face parallel to the bonding plane is formed on the support surface, and the adhesive is also present between the bonding plane and the end face.

The fourth aspect of the present invention is a method of manufacturing an ink jet print head, wherein the ink jet print head has a printing element substrate with printing elements producing energy for ink ejection and a supporting member having a support surface and at least one raised flat portion with an end face formed on the support surface.

The method comprises: applying an adhesive between the support surface and the end face; contacting the printing element substrate with the adhesive so that a bonding plane of the printing element substrate and the end face are parallel; and hardening the adhesive.

Further features of the present invention will become apparent from the following description of exemplary embodiments (with reference to the attached drawings).

DESCRIPTION OF THE EMBODIMENTS

Embodiment 1

Figure 1:
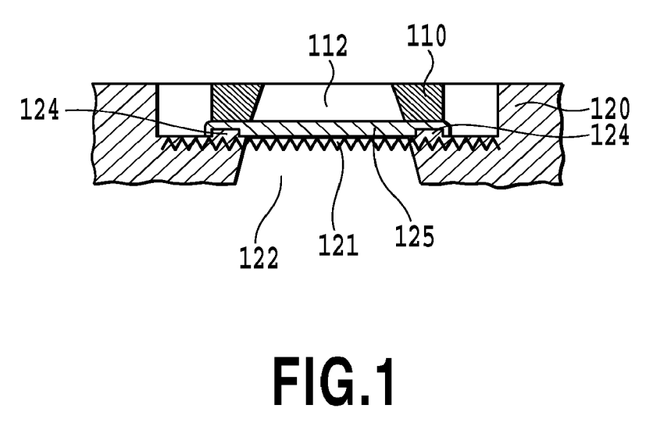
FIG. 1 is a cross-sectional view showing a printing element substrate bonded to a supporting member in an ink jet print head of embodiment 1.
Figure 2:
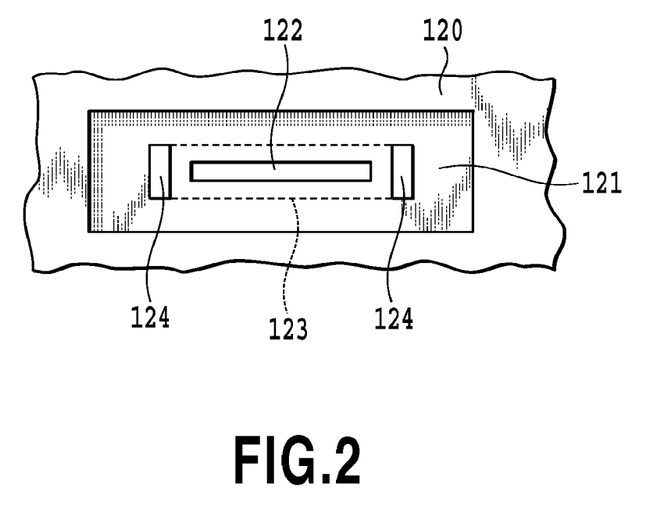
FIG. 2 is a top view showing a support surface of the supporting member before the printing element substrate is bonded to it in embodiment 1.

FIG. 1 is a cross-sectional view showing a printing element substrate 110 bonded to a supporting member 120 in the ink jet print head of this embodiment. FIG. 2 is a top view showing an outline of a support surface 121 of the supporting member 120 before bonding. The support surface 121 on which to support the printing element substrate 110 is a molded product that has an ink supply path 122 at the central part thereof. Setting the printing element substrate 110 accurately at a connecting position 123 marked with a broken line allows an ink supply port 112 of the printing element substrate 110 to be connected to the ink supply path 122, securing a stable supply of ink to the printing element substrate 110. In this embodiment, at both ends of the elongate connecting position 123 there are two raised flat portions 124. The provision of the raised flat portions 124 can reduce the thickness of a thermosetting adhesive 125 between the printing element substrate 110 and the support surface 121 in the raised flat portions, compared with the thickness of the thermosetting adhesive in other portions.

As this construction in which the raised flat portions are provided on a part of the support surface, a variation of flatness can be suppressed. For suppressing the variation of flatness, it is favorable to narrow the raised flat portions as much as possible. Considering variations among the raised flat portions, it is favorable to keep the number of the raised flat portions as low as possible. With this embodiment wherein two raised flat portions are provided at both ends of the elongate connecting position 123, the high level flatness of the raised flat portions can be achieved and it is possible to keep the flatness of the printing element substrate at a high level.

Figure 3:
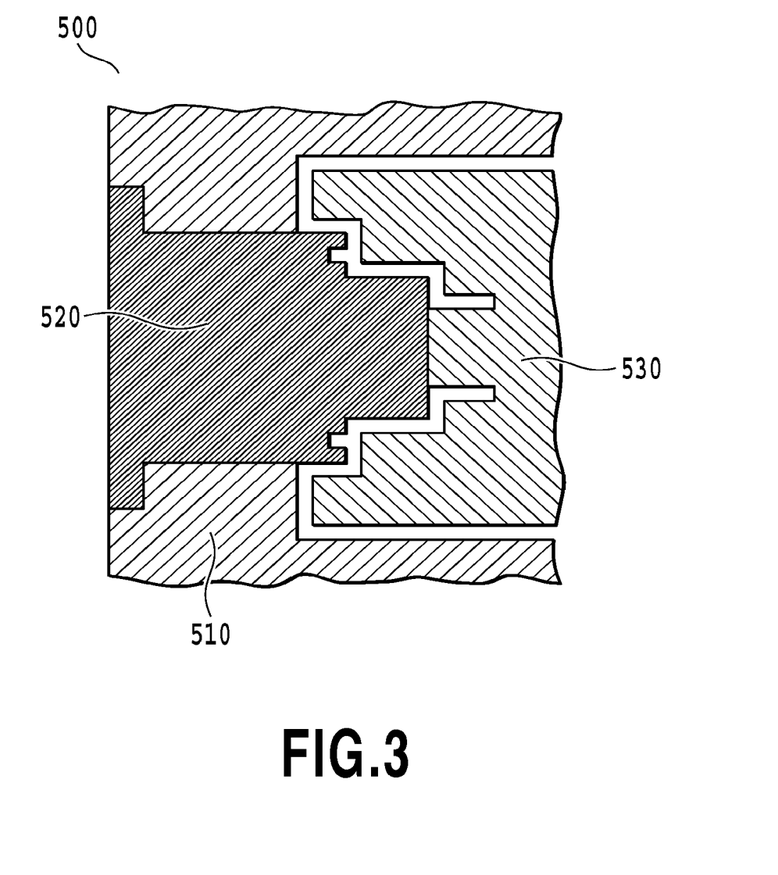
FIG. 3 is a schematic cross-sectional view of a die used to form the supporting member.

FIG. 3 is a schematic cross section showing a construction of a die 500 to form the supporting member 120. As shown in the figure, the die 500 comprises three parts—an outside piece 510, an inside piece 530 and a raised flat portion piece 520. The raised flat portion piece that requires high precision has a set-in construction.

Figure 4A:
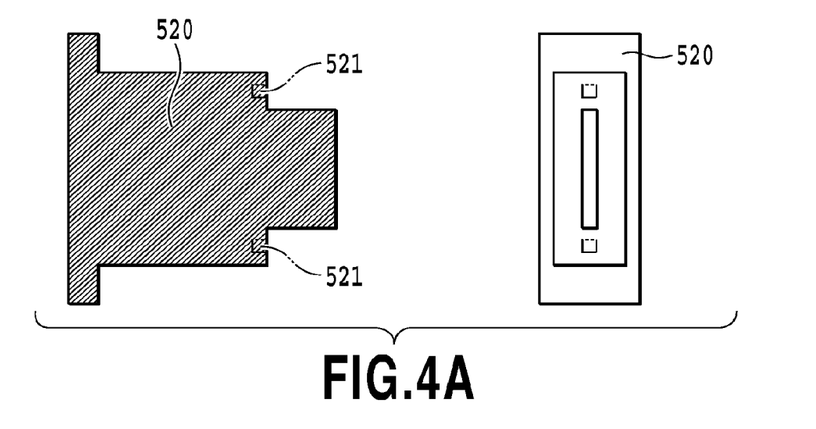
FIGS. 4A to 4C are schematic views showing a process of forming raised flat portions by using a molding die.
Figure 4B:
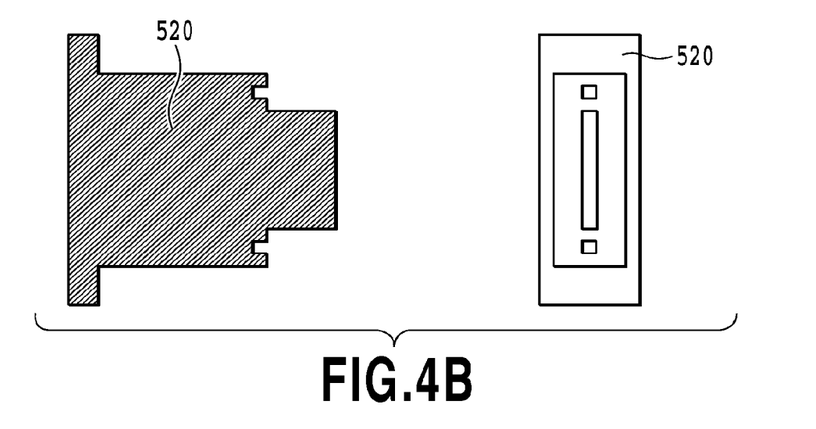
Figure 4C:
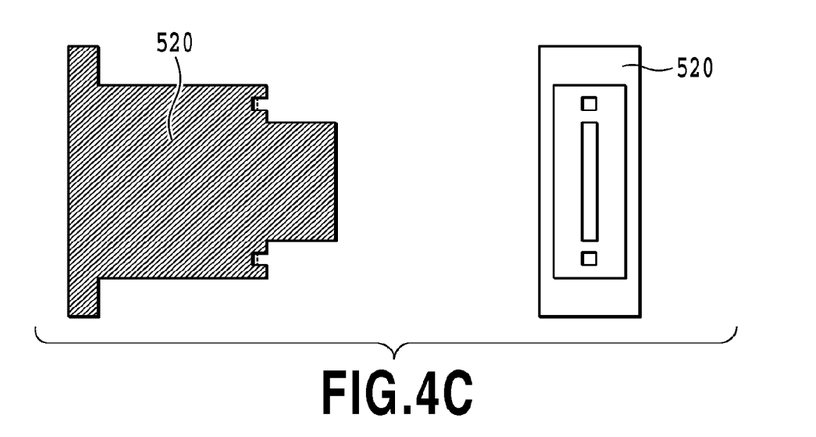

FIGS. 4A-4C schematically show a process of forming the raised flat portions 124 on the raised flat portion piece 520. FIG. 4A shows side and top views of the raised flat portion piece 520 that was cut to have a shape in which to form the raised flat portions 124.

Then an electrical discharge machining is performed on the raised flat portion piece 520 at parts 521 where the raised flat portions are to be formed, thus forming the raised flat portions as shown in FIG. 4B. Then, raised flat portions of the supporting member molded by this raised flat portion piece 520 of the die 500 is measured with high accuracy. If any errors are detected, the raised flat portion piece 520 is again subjected to the electrical discharge machining to correct the height of the raised portions. Now, a die for the raised flat portions is complete (FIG. 4C).

In this embodiment the die may be formed of modified polyphenyleneether. In that case, the height of the top surface of the raised flat portions 124 from the support surface 121 may be set to 0.05 mm to keep variations of flatness of the raised flat portions 124 to within about 0.015 mm.

Figure 5:
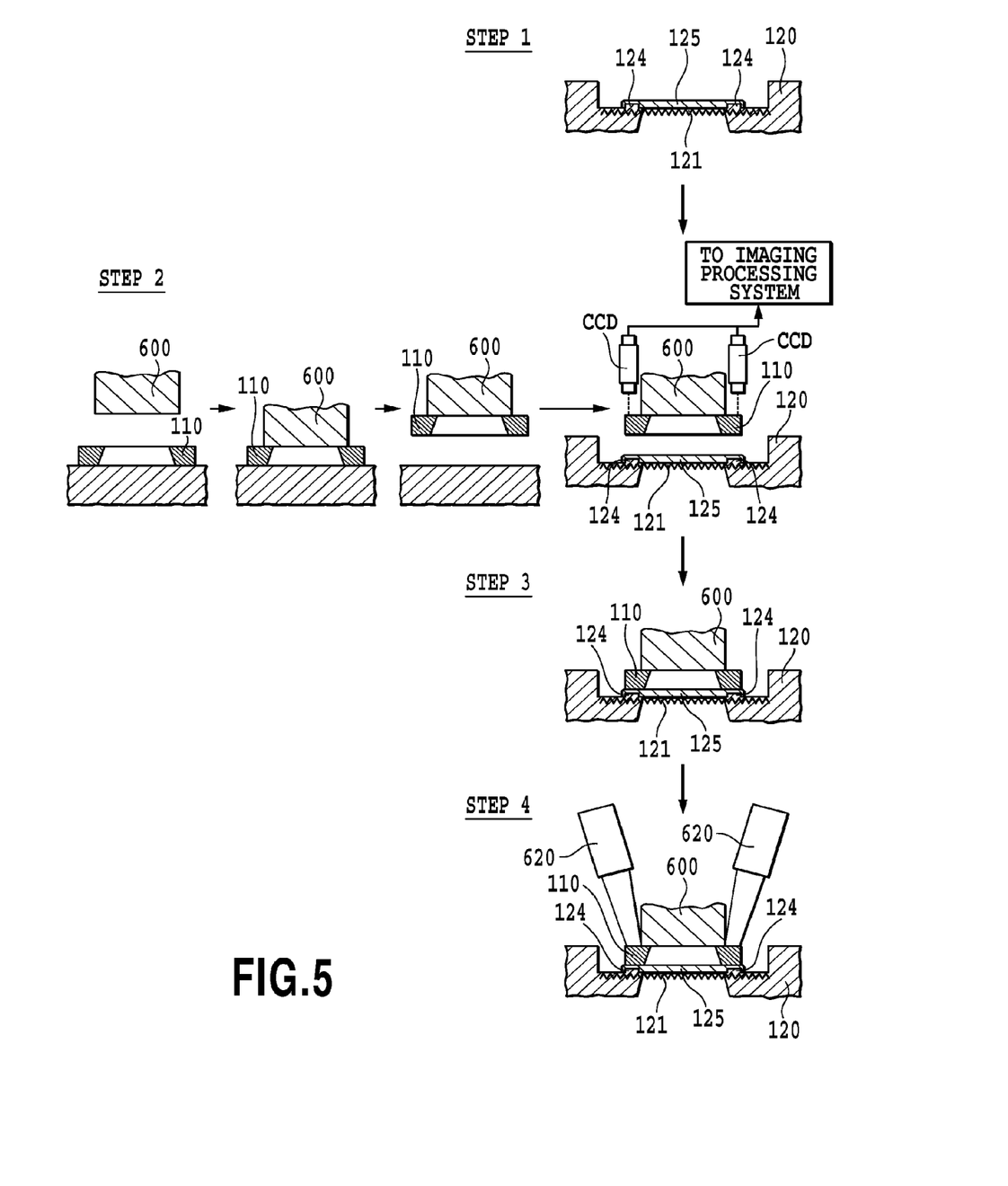
FIG. 5 shows a sequence of steps to bond and fix the printing element substrate to the support surface having the raised flat portions in the process of assembling the print head of embodiment 1.

FIG. 5 shows how the printing element substrate 110 is bonded and fixed through a thermosetting adhesive to the support surface 121 having the raised flat portions 124 in a print head assembly process.

First, in step 1, a thermosetting adhesive 125 is applied to the support surface 121 of the supporting member 120. The thermosetting adhesive used here preferably has a high viscosity so that it does not flow into the ink support port or the like.

Then in step 2, the printing element substrate 110 is sucked by a jig (a supply finger 600) and moved to over the support surface 121. Then, using an image processing system with CCD cameras, the position of the printing element substrate 110 is adjusted. The position adjustment made here enables the ink supply port 112 of the printing element substrate 110 to communicate with the ink supply path 122 formed in the supporting member 120. Further, the printing element substrate 110 is held parallel to the support surface 121.

In step 3, the supply finger 600 is lowered to hold the printing element substrate 110 at a position about 20 μm above the upper surface of the raised flat portions 124 where the printing element substrate 110 is in contact with the thermosetting adhesive 125. In this state the thermosetting adhesive 125 is not yet hardened and the printing element substrate 110 is held and kept at the adjusted position by the supply finger 600.

Then in step 4, a light application device 620 is used to radiate light against portions of the surface of the printing element substrate 110 not covered by the supply finger. In this embodiment, ultraviolet light is used as a light source and 8000 mW/cm$^2$ (at a wavelength of 365 nm) of light is emitted to two points near the short side ends of the printing element substrate 110. The irradiation of ultraviolet light causes the temperature of the printing element substrate 110 to rise, hardening the thermosetting adhesive 125 present at the back of the printing element substrate 110, with the result that the printing element substrate 110 is bonded and secured at the adjusted position to the supporting member 120. That is, although the raised flat portions 124 have flatness variations of about 0.015 mm, the printing element substrate 110 is not affected by this degree of undulations and can be horizontally fixed at a position about 0.02 mm (20 μm) above the upper surface of the raised flat portions 124 of the supporting member 120. The thermosetting adhesive present on the two raised flat portions 124 hardens faster than the thermosetting adhesive in other portions during the hardening process of step 4 because it is thinner than in other portions. As a result, the time taken by the application of ultraviolet light to have the printing element substrate 110 bonded and secured to the supporting member 120 with a required strength can be shortened when compared to a case where the raised flat portions are not provided. In this embodiment, the light application time has decreased by about 20% from that when the raised flat portions are not provided, thus making it possible to improve the mass production capability of the print head.

In this embodiment, since the raised flat portions are formed at both ends of the elongate connecting position 123 (see FIG. 2) on the printing element substrate thermosetting adhesive hardens from at both ends of the printing element substrate 110. Therefore the thermosetting adhesive applied to this position hardens in a short time (about 2 sec) to keep flatness between the supporting member 120 and the printing element substrate 110 with a high accuracy. The longer the printing element substrate 110 is, the more this construction is effective. Especially, when a longitudinal length of the printing substrate 110 is longer than 0.85 inch it is difficult to keep the flatness of the printing element substrate. In this case the construction of the present embodiment is preferable.

Additionally the thermosetting adhesive in portions other than the raised flat portions does not need to harden completely at this time. That is, it is necessary for only the thermosetting adhesive at the raised flat portions which is thinner than in other portions to harden completely. Regarding other portions, the thermosetting adhesive may be hardened completely by heating at 100° C. for one hour after sealing a connection between the printing element substrate 110 and the electric wiring board 130.

Embodiment 2

Figure 6:
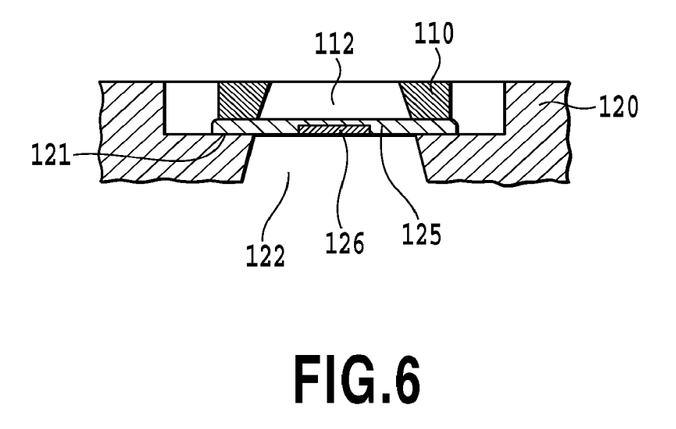
FIG. 6 is a cross-sectional view showing a printing element substrate bonded to a supporting member in an ink jet print head of embodiment 2.
Figure 7:
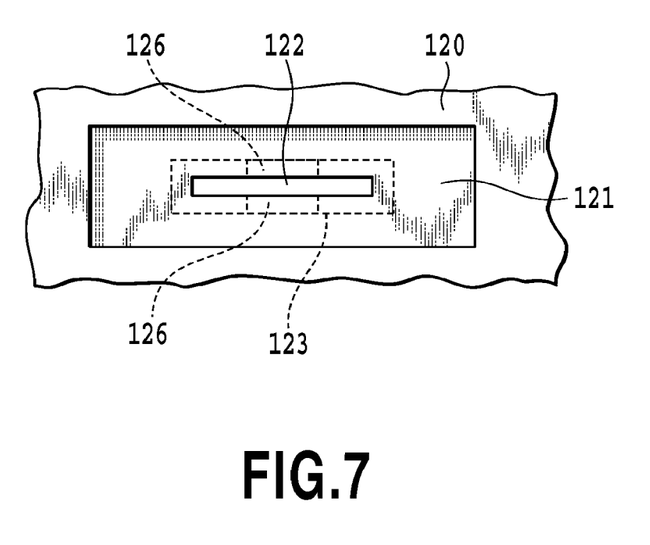
FIG. 7 is a top view showing a support surface of the supporting member before the printing element substrate is bonded to it in embodiment 2.

FIG. 6 is a cross-sectional view showing the printing element substrate 110 bonded to the supporting member 120 in the ink jet print head of this embodiment. FIG. 7 is a top view showing an outline of the support surface 121 of the supporting member 120 before bonding. In this embodiment, two raised flat portions 126 are formed at a central part of the connecting position 123. The provision of the raised flat portion at this position allows the thermosetting adhesive 125 between the printing element substrate 110 and the support surface 121 to be partly reduced.

Figure 8:
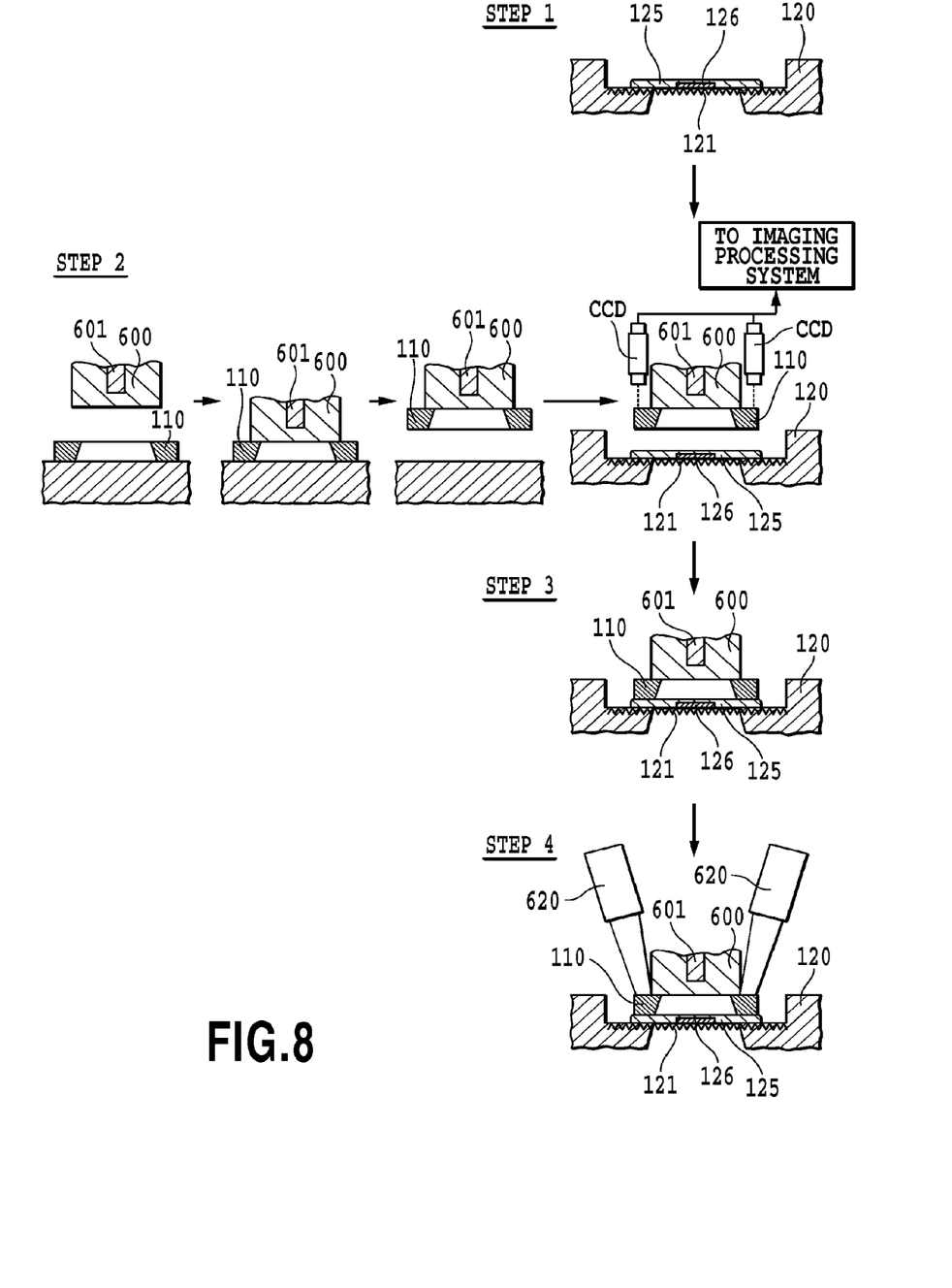
FIG. 8 shows a sequence of steps to bond and fix the printing element substrate to the support surface having raised flat portions in the process of assembling the print head of embodiment 2.

FIG. 8 shows how the printing element substrate 110 is bonded and fixed to the support surface 121 having the raised flat portions 126 in a print head assembly process of this embodiment.

First, in step 1, the support surface 121 of the supporting member 120 is applied with a thermosetting adhesive 125. The thermosetting adhesive used here preferably has a high viscosity, as in embodiment 1, so that it does not flow into the ink supply port or the like.

In the next step 2, the printing element substrate 110 is sucked by a supply finger 600 already heated to a predetermined temperature (in this embodiment, 150° C.) by a built-in heater 601 and is moved to over the support surface 121. Then, using an image processing system with CCD cameras, the position of the printing element substrate 110 is adjusted. The position adjustment made here enables the ink paths of the printing element substrate 110 to communicate with the ink supply path 122 formed in the supporting member 120. Further, the printing element substrate 110 is held parallel to the support surface 121.

In step 3, the supply finger 600 is lowered to hold the printing element substrate 110 at a position about 20 μm above the upper surface of the raised flat portions 126 where the printing element substrate 110 is in contact with the thermosetting adhesive 125. In this embodiment, since the printing element substrate 110 is already heated, the moment it comes into contact with the thermosetting adhesive 125, the thermosetting adhesive 125 starts to harden. Until the thermosetting adhesive hardens enough, the supply finger 600 maintains the printing element substrate 110 in a fixed attitude at the adjusted position by keeping sucking it. When the thermosetting adhesive 125 at least between the printing element substrate 110 and the raised flat portion 126 has hardened enough, the supply finger 600 releases the printing element substrate 110.

With the above process, the printing element substrate 110 is securely bonded to the supporting member 120 at the adjusted position. Although the raised flat portions 126 have levelness variations of about 0.015 mm, the printing element substrate 110 is not affected by the undulations, but is horizontally secured at a position approximately 20 μm from the upper surface of the raised flat portion 126 of the supporting member 120. In the hardening process of step 3, the thermosetting adhesive present on the raised flat portions 126 hardens faster than in other parts because of its reduced thickness. Further, in this embodiment since the printing element substrate 110 is heated before it contacts with the thermosetting adhesive 125, it is expected that the time it takes for the printing element substrate 110 to be bonded to the supporting member 120 with a required strength can be made shorter than in embodiment 1.

In case the supply finger which has been heated is used, considering a heat transmission, it is preferable to form the raised flat portions at a sucking area between the supply finger and the printing element substrate. Especially, considering a quick heat transmission from the supply finger to the printing element substrate 110, it is preferable to form the raised flat portions on the supporting member 120 at two portions corresponding to center of the printing element substrate.

Although the above embodiment uses ultraviolet light as a light source or directly heats the printing element substrate, the thermosetting adhesive may be heated by whatever means is available as long as it can produce enough heat to harden the thermosetting adhesive used. For example, other light sources such as infrared light may be used.

The above embodiment uses modified polyphenyleneether as a molding material and sets the height of the upper surface of the raised flat portion 126 from the support surface 121 at 0.05 mm. This invention, however, is not limited to this setting. While the height of the upper surface of the raised flat portion 126 from the support surface 121 should preferably be set in a range of between 0.01 mm and 0.20 mm, the present invention can perform its function effectively as long as the height in question can be adjusted to an appropriate value taking into account molding material's characteristics, die precision and physical properties of thermosetting adhesive.

Further, the position where the raised flat portion is formed is not limited to those shown in the above two embodiments. If the portion of the printing element substrate that corresponds to the raised flat portion can be heated effectively to harden the thermosetting adhesive at the raised flat portion as quickly as possible, an intended effect of this invention can readily be produced.

It is also preferable to provide the raised flat portions at three portions for bonding the printing element substrate accurately. In this case it is preferable to provide the three raised flat portions at both ends of the elongate connecting position 123 of one side of the ink supply path and at center of the elongate connecting position 123 of other side of the ink supply path.

As described above, this invention performs the steps of providing in a bonding surface between the printing element substrate and the supporting member a thin portion of an adhesive layer, adjusting the relative position between the printing element substrate and the supporting member and then hardening the thin portion of the adhesive layer. This enables the printing element substrate to be bonded to the supporting member accurately in a relatively short period of time. As a result, if there are undulations on the support surface, the mass productivity of the print head with high precision can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-149376, filed Jun. 6, 2008, and 2009-113565, filed May 8, 2009, which are hereby incorporated by reference herein in their entirety.

What is claimed is:

1. An ink jet print head comprising:
a printing element substrate which has printing elements producing energy for ink ejection, the printing elements being arrayed in a longitudinal direction, the printing element substrate having two main surfaces, with a bonding plane disposed on one main surface and the printing elements being disposed on the other, opposite main surface;
a supporting member having a support surface thereof on which to support said printing element substrate, a supply path for supplying ink to said printing element substrate, and raised portions having flat top surfaces being provided on a part of the support surface, the supply path having two longitudinal sides extending parallel to the longitudinal direction and two end sides extending in a short-side direction orthogonal to the longitudinal direction and connecting the two longitudinal sides, the raised portions being provided along a portion of, but not along the entirety of, at least one of the two longitudinal sides of the supply path and being not provided along either of the two end sides of the supply path; and an adhesive to bond said printing element substrate and said supporting member by being present between 1) the bonding plane of said printing element substrate and 2) the support surface, wherein a thickness of said adhesive between the flat top surfaces of the raised portions and the bonding plane of said printing element substrate is less than a thickness of said adhesive between the support surface, other than at the parts of the support surface on which the raised portions are provided, and the bonding plane of said printing element substrate.

2. The ink jet print head according to claim 1, wherein said adhesive comprises a thermosetting adhesive.

3. An ink jet print head comprising:

a printing element substrate which has printing elements producing energy for ink ejection, the printing elements being arrayed in a longitudinal direction, the printing element substrate having two main surfaces, with a bonding plane disposed on one main surface and the printing elements being disposed on the other, opposite main surface;

a supporting member having a support surface thereof on which to support said printing element substrate, a supply path for supplying ink to said printing element substrate, and raised portions having flat top surfaces being provided on a part of the support surface, the supply path having two longitudinal sides extending parallel to the longitudinal direction and two end sides extending in a short-side direction orthogonal to the longitudinal direction and connecting the two longitudinal sides, the raised portions being not provided along either of the two longitudinal sides of the supply path and being provided along the entirety of both end sides of the supply path; and an adhesive to bond said printing element substrate and said supporting member by being present between 1) the bonding plane of said printing element substrate and 2) the support surface, wherein a thickness of said adhesive between the flat top surfaces of the raised portions and the bonding plane of said printing element substrate is less than a thickness of said adhesive between the support surface, other than at the parts of the support surface on which the raised portions are provided, and the bonding plane of said printing element substrate.

* * * * *